United States Patent [19]

Mehoudar

[11] 4,366,926

[45] Jan. 4, 1983

[54] IRRIGATION EMITTER UNIT

[75] Inventor: Raphael Mehoudar, Tel-Aviv, Israel

[73] Assignee: Hydro-Plan Engineering, Ltd., Tel-Aviv, Israel

[21] Appl. No.: 171,048

[22] Filed: Jul. 22, 1980

[30] Foreign Application Priority Data

Aug. 6, 1979 [IL] Israel .................................. 57986

[51] Int. Cl.³ ............................................ B05B 15/00
[52] U.S. Cl. .................................................. 239/542
[58] Field of Search ............... 239/542, 570, 533.1, 239/533.13, 547; 138/42–46

[56] References Cited

U.S. PATENT DOCUMENTS

| 3,604,728 | 9/1971 | Symcha | 239/542 |
|---|---|---|---|
| 3,870,236 | 3/1975 | Barragan | 239/542 |
| 3,998,391 | 12/1976 | Lemelshtrich | 239/542 |
| 4,060,200 | 11/1977 | Mehoudar | 239/542 |
| 4,209,133 | 6/1980 | Mehoudar | 239/542 |
| 4,210,287 | 7/1980 | Mehoudar | 239/542 |
| 4,215,822 | 8/1980 | Mehoudar | 239/542 |
| 4,307,841 | 12/1981 | Mehoudar | 239/542 |

Primary Examiner—Andres Kashnikow
Assistant Examiner—Gene A. Church
Attorney, Agent, or Firm—Browdy & Neimark

[57] ABSTRACT

An in-line emitter unit comprising a tubular connector member having end portions adapted to connect together two successive lengths of irrigation conduit, a well structure formed integrally with an outer wall portion of the connector member, an inlet formed in said outer wall portion serving to effect communication between the interior of the tubular connector and the well structure, a cover member for the well structure, an elongated groove formed in an inner wall of the cover member, a recessed cavity formed in said inner wall and communicating with one end of the groove and being of extended dimensions as compared with the width of the groove, an outlet bore constituting a unit outlet and formed coaxially in a base portion of the cavity and having a rim area substantially less than that of the cavity, a resiliently flexible membrane located in the well structure and juxtaposed with respect to the inner wall so as to define with said groove a flow restricting flowpath, a second and opposite end of the groove communicating with the interior of the well structure; the arrangement being such that the membrane is displaceable towards and away from the base cavity portion of the cavity in accordance with pressure variations so as to stabilize the output rate of the emitter unit with respect to the variations.

8 Claims, 5 Drawing Figures

IRRIGATION EMITTER UNIT

This invention relates to in-line emitter units for use in drip level irrigation systems. As used in the present specification the term "in-line emitter unit" denotes an emitter unit having end portions adapted to connect together two successive lengths of irrigation conduit so that irrigation liquid flows through the conduit and emitter unit in series, a portion of the liquid emerging from each emitter unit as a substantially pressureless drip. Known in-line emitter units of the kind are disclosed, for example, in U.S. Pat. Nos. 3,420,064, 3,604,728 and 3,667,687.

It is well known that the output flow rate of emitter units of all kinds are sensitive to flow pressure variations in the irrigation conduits and, in order at least to limit the effect of such flow pressure variations on the output rates, various proposals have been made to provide emitter units with pressure control means. Examples of such proposals are, for example, to be found in U.S. Pat. Nos. 3,767,124, 3,814,377, 3,841,349, 3,882,892 and 4,132,365 and in the Applicants' U.S. Pat. No. 4,209,133.

It is an object of the present invention to provide an in-line emitter unit wherein means are provided for stabilizing the outflow rate of the emitter unit with respect to pressure variations in the irrigation conduit in which it is coupled.

According to the present invention there is provided an in-line emitter unit comprising a tubular connector member having end portions adapted to connect together two successive lengths of irrigation conduit, a well structure formed integrally with an outer wall portion of the connector member, an inlet formed in said outer wall portion serving to effect communication between the interior of the tubular connector and the well structure, a cover member adapted to be fitted into the well structure, an elongated groove formed in an inner wall of the cover member, a recessed cavity formed in said inner wall and communicating with one end of the groove and being of extended dimensions as compared with the width of the groove, an outlet bore constituting a unit outlet and formed coaxially in a base portion of the cavity and having a rim area substantially less than that of the cavity, a resiliently flexible membrane located in the well structure and juxtaposed with respect to the inner wall so as to define with said groove a flow restricting flowpath, a second and opposite end of said groove communicating with the interior of the well structure; the arrangement being such that the membrane is displaceable towards and away from the cavity in accordance with pressure variations so as to stabilize the output rate of the emitter unit with respect to the variations.

One embodiment of an in-line emitter unit in accordance with the present invention will now be described by way of example and with reference to the accompanying drawings in which.

Figure 1:
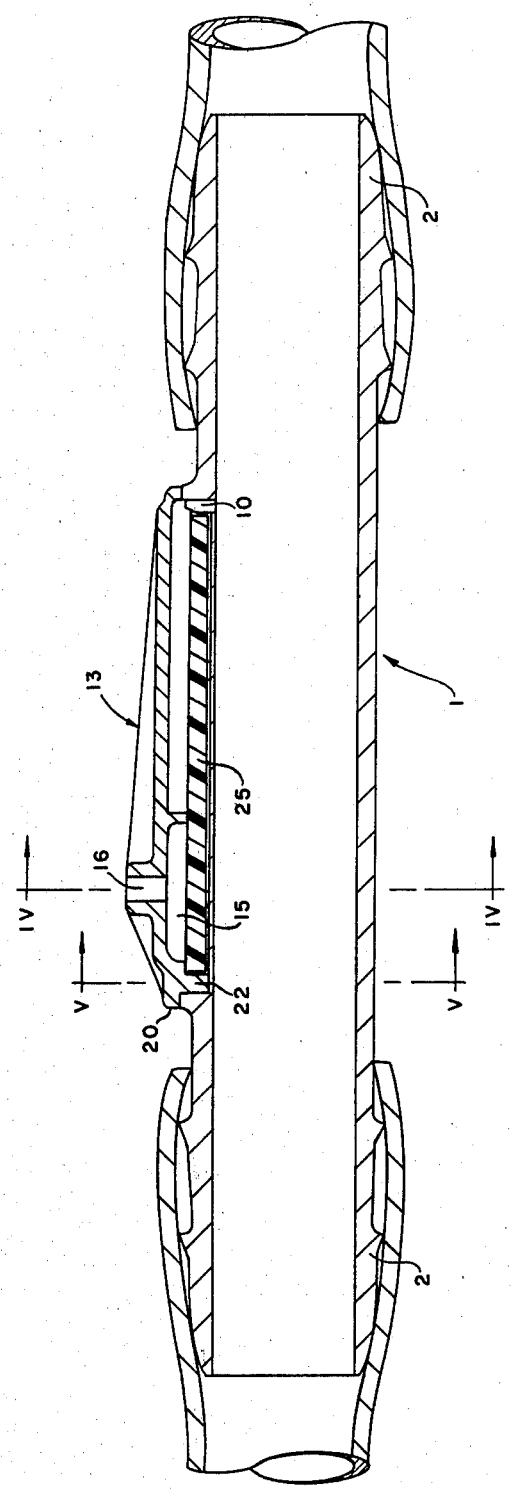
FIG. 1 is a longitudinally sectioned view of the emitter unit.

As seen in the drawings a tubular connector unit 1 is formed with a pair of barbed coupling end portions 2, the connector being formed at an intermediate portion thereof with a recessed well structure 3 formed integrally with an outer wall portion of the connector and surrounded by a peripheral wall 4 formed integrally and merging with the connector body, the base of the well structure 3 being constituted by an external surface of the curved cylindrical outer wall of the intermediate portion of the connector, the axial central wall portion 5 being substantially flattened and being substantially co-planar with the upper surfaces of transversely directed reinforcing ribs 6 which extend throughout the depth of the well structure merging with the cylindrical external wall and with the peripheral wall 4.

Both end portions of the substantially flattened axial central wall portion 5 merge respectively with terminal thickened end portions 7 in each of which is formed a pair of elongated inlet apertures 8 separated by a central partition 9 and bounded at either end by a pair of bevelled guide posts 10.

As seen in FIGS. 1, 3, 4 and 5, a cover member 13 corresponding in peripheral shape and size to the well structure 3 comprises a substantially planar cover wall 14 in the under-surface of which is formed a cavity-like recess 15 having a centrally located throughgoing outlet aperture 16. The recess 15 communicates with one end of an elongated groove 17 formed with pairs of oppositely directed, sets of flow resisting, substantially triangular baffles 18, the other end 19 of the groove 17 merging with the edge of the cover wall 14. Peripherally surrounding the cover wall 14 is an outwardly directed peripheral flange 20 which conforms in shape and in size with the corresponding upper surface of the peripheral wall 4 of the well structure 3.

The cavity 15 is of substantially larger dimensions than the width of the groove 17 whilst the peripheral area of the cavity 15 is substantially larger than that of the outlet aperture 16.

Formed at the corners of the cover member and extending out of the under-surface thereof are four, bevelled, locating posts 21. Formed at the end of the cover member opposite the groove end 19 and extending out of the under-surface thereof, between a pair of locating posts 21, is a pair of rectangularly cross-sectioned, obturating posts 22, so dimensioned, shaped and located as to be capable of being substantially sealingly disposed in one or other of the pairs of inlet apertures 8 formed in the well structure 3.

Figure 3:
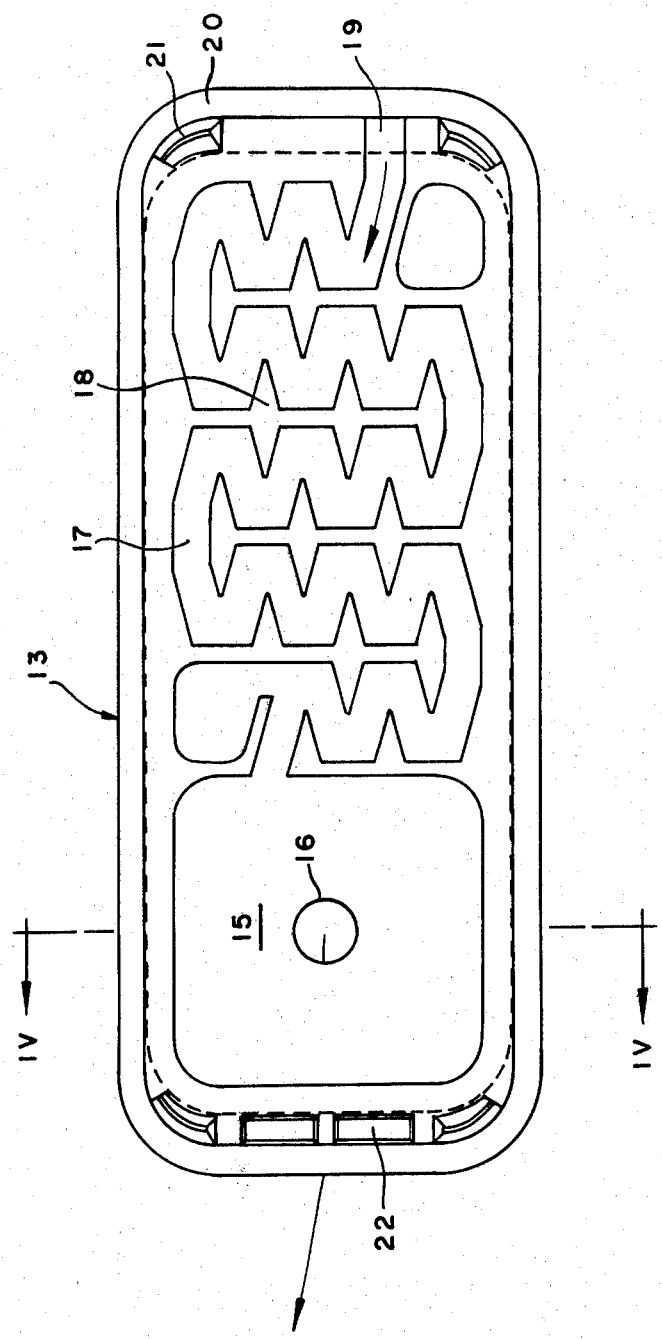
FIG. 3 is a plan view from below of the cover member.
Figure 5:
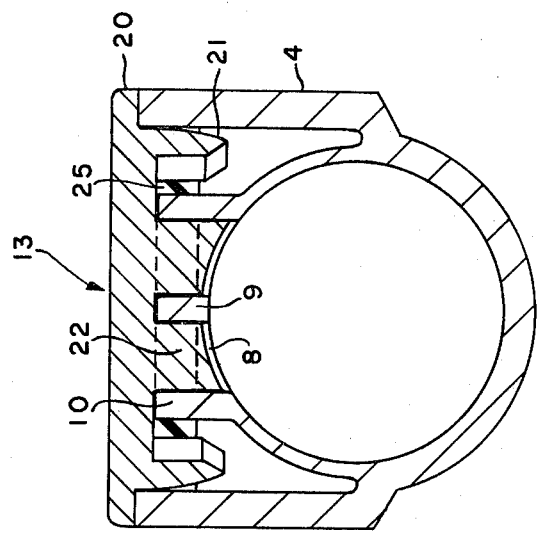
FIGS. 4 and 5 are respective cross-sectional views of the emitter unit shown in FIG. 1 taken along the lines IV—IV and V—V.
Figure 4:
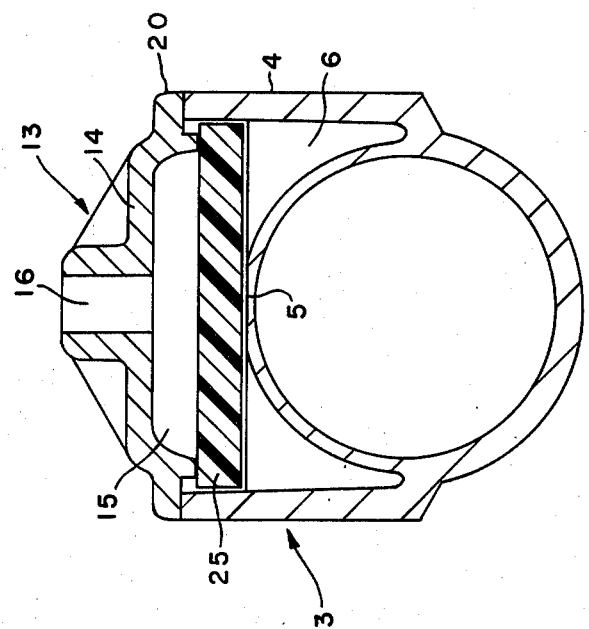

A rectangular, flexibly resilient, rubber membrane 25 is located in the well structure 3 (its relative disposition with respect to the cover member 13 when the latter is placed in position with respect to the well structure 3 being shown in dotted lines in FIG. 3 of the drawings). As can be seen the membrane 25 is so dimensioned as to be located in position by the bevelled guide posts 10 and, when the cover member is located in position, by the bevelled locating posts 21. In this way the membrane covers the entire groove 17 and cavity 15 apart from the inlet 19 and defines with the groove a flow restricting flowpath and with the cavity 15 an outlet control chamber.

Figure 2:
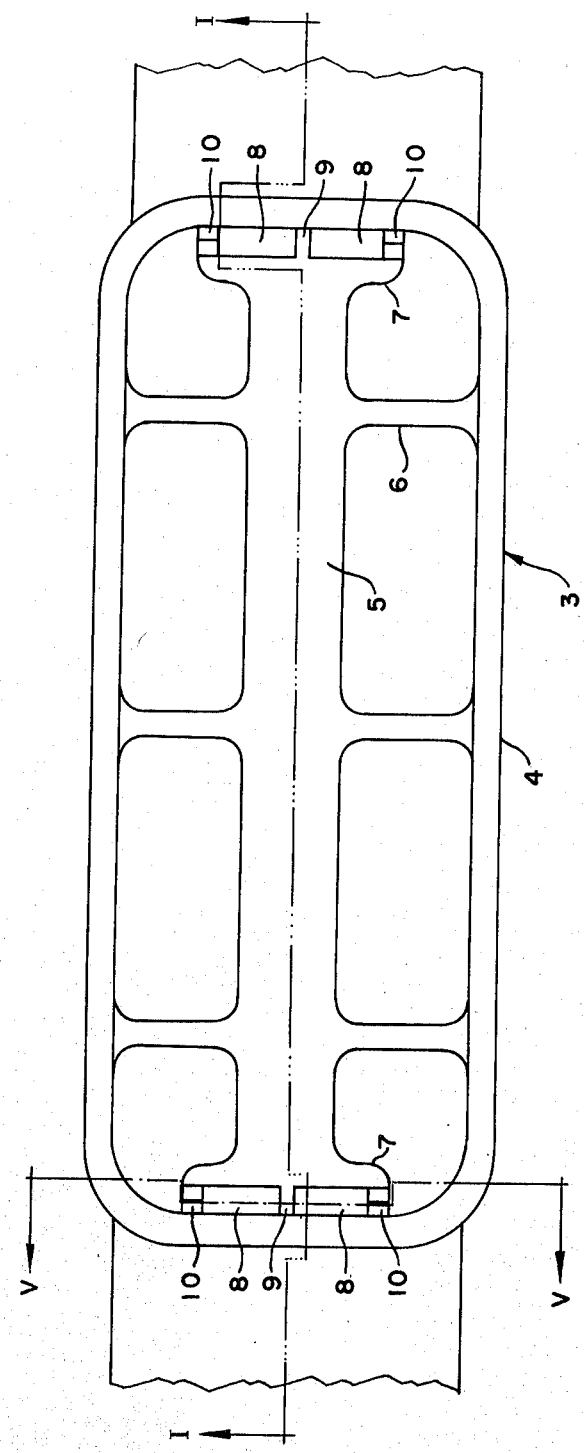
FIG. 2 is a plan view, from above, of the emitter unit shown in FIG. 1 with its cover member and flexible membrane removed.

Similarly it can be seen with reference to FIG. 2 of the drawings that the membrane 25 effectively fills the well structure 3 apart from the inlet apertures 8.

The assembly of the emitter unit whose constituent parts have just been described takes place as follows: The rubber membrane 25 is placed in position in the well structure 3 so as to occupy the position shown in outline. The cover member 13 is then placed in position with respect to the well structure 3 with its flange 20 superimposed and in contact with the upper surface of the peripheral wall 4 and with its obturating posts 22 fitting into and sealing one pair of adjacent inlet apertures 8 leaving the opposite pair open. It will be understood that, by virtue of the provision of two oppositely located pairs of inlet apertures 8 on the one hand, and a cover member with one pair of obturating posts 22 on the other hand, there is no restriction on the sense or direction in which the cover member 13 is fitted to the well structure 3. Thus whichever the direction, the pair of inlet apertures 8 remote from the groove end 19 is always closed whilst the other pair of inlet apertures adjacent the groove end 19 is always open. This feature considerably simplifies the assemby of the units.

With the cover member 13 located in position, the membrane 25 is located as shown in outline in FIG. 3 of the drawings and the cover member can be effectively sealed to the well structure by heat welding or the like.

It is to be noted that in the assembled emitter unit the rubber membrane is not rigidly clamped with respect to the cover member well structure but, as can be seen enjoys a certain degree of freedom of motion and therefore, to a certain extent, floats with respect thereto.

In use emitter units of the kind just described are used to couple together successive adjacent lengths of irrigation conduit and, with the flow of water through the conduit, water passes through the open inlet apertures 8 so as to fill that portion of the well structure 3 below each membrane 25 and thereby to press the membrane against the under-surface of the cover member 13. At the same time, water passes from the well structure 3 into the end 19 of the flowpath 17 emerging therefrom into an outlet control chamber (defined by the cavity 15 and the membrane 25) and finally emerging out of the outlet aperture 16 of the emitter unit as a pressureless drip.

The membrane 25 is so chosen and located vis-a-vis the outlet aperture 16 that the pressure in the outlet chamber is always maintained a predetermined amount less than the pressure in the conduit. Thus, as a consequence of a rise in the main supply pressure of the water flowing through the conduit, the rate of flow through the groove 17 into the outlet chamber tends to rise. Any such increase in the rate of flow tends, of itself to give rise to an increased pressure differential between the conduit and the outlet chamber and therefore across the membrane 25. Such an increased pressure differential tends to cause the membrane 25 to flex towards the outlet aperture 16 thereby creating a restricted flowpath defined between the arched membrane 25 and the rim of the aperture 16. As a consequence, the pressure in the outlet chamber tends to rise, the predetermined pressure differential tends to be restored and therefore the differential pressure between the two ends of the groove 17 is maintained constant the flow rate through the groove and therefore the overall outflow rate is maintained constant within a relatively narrow range.

Any tendency for the outlet aperture 16 to become blocked immediately causes a reduction in the flow rate through the restricting flowpath with a consequent decrease in the pressure differential giving rise to a return movement of the membrane 25 and the flushing out of the blockage through increased passageway now available between the membrane and the rim of the outlet aperture. A similar situation obtains in the control mechanism during the build-up of the pressure differential upon the onset of irrigation flow and during the dying down of the differential when the irrigation supply is cut off. In both cases the relatively unrestricted outflow path allows for the liquid pressure in the outlet control chamber to flush out obstructions from the outlet aperture 16. In this way the emitter unit can be considered as being self-flushing.

As can be seen the membrane 25 is spaced a relatively substantial distance from the outlet aperture 16 and on this way it can be ensured that a relatively substantial displacement of the membrane 25 is required before the outflow rate is restricted. In this way, it can be ensured that the displacement of the membrane 25 does not of itself introduce undesirable losses during the pressure differential build-up period operation range of the units.

Furthermore, it can be seen that the size of the outlet aperture 16 is relatively small as compared with the peripheral area of the cavity 15. This is necessary in order to ensure that the predetermined pressure differential between the conduit and the outlet chamber previously referred to is not unduly influenced by the magnitude of the inflow pressure.

This maintenance of a substantially constant pressure differential with the pressure in the outlet control chamber being less than the pressure in the conduit by a fixed predetermined amount (but being significantly greater than zero) carries with it the implication that the flow restricting flowpath is not required to effect pressure reduction down to zero. This considerably simplifies the constructional requirements for the flow restricting flowpath which can be of relatively reduced length. Thus, in the example illustrated a relatively short groove with relatively few triangular baffles is sufficient to reduce the flow pressure by the predetermined pressure differential (e.g. 3 meters) which is maintained between the pressure in the conduit and the pressure in the control chamber. The subsequent reduction of pressure is achieved by the passage through the well 6 of the aperture 16, as restricted by the membrane 17. Furthermore the membrane is pressed against the under surface of the cover member 13 solely under the influence of water pressure and this means that the membrane effectively floats. The provision of a floating membrane in association with the emitter unit affords certain distinct advantages. Thus, it will be appreciated that the degree of pressure control to be effected by the membrane depends to a great extent on the degree of resilience of the membrane.

Quite clearly, this degree of resilience is increased when the membrane effectively floats as compared to the condition where the edges of the membrane are mechanically clamped. The mechanical clamping of the member introduces tolerances into the manufacture of the unit and this in turn affects the accuracy of pressure control. Furthermore, a clamped membrane, once detached from its clamped position under the influences of pressure, could not return to its clamped position, and a unit including such a clamped membrane would therefore be useless for further use until repaired. This is not the case where the membrane effectively floats. Finally, when the membrane is clamped, control is effected as a consequence of both the bending and the stretching of the membrane; but when it floats, control is only dependent on the bending of the membrane and such a membrane is much more simple to manufacture and in point of fact relatively cheap materials can be utilized therefor.

By virtue of the fact that the flowpath is defined between a cover member and a relatively floating rubber membrane which is pressed into position under the water pressure prevailing during the use of the system, no close sealing of adjacent parts is required as is the case with known in-line emitter units.

An improved and simplified sealing of the membrane vis-a-vis the cover member is also achieved by virtue of the fact that the cover member, being planar has no interfering molding parting line as is the case with the known tubular members.

It will be realised that the form of flow restricting flowpath is effectively dictated by the groove formed in a substantially planar cover member. In consequence this cover member is the only constituent of the emitter unit which requires accurate manufacturing tolerances. Such a planar cover member can be readily and simply manufactured as compared with tubular or cylindrical components forming part of hitherto known in-line emitter units.

Furthermore, as compared with well known in-line emitter units where the flowpath is defined between tubular co-axial parts respectively coupled to the adjacent lengths of conduit, with the in-line emitter unit in accordance with the present invention, the flowpath is defined between the tubular connector and an entirely separate part which is not coupled to a conduit length. Thus there is considerably minimized the danger that the constituent parts defining the flowpath may come apart during use.

Thus the present invention allows for the simple and economical production of a compact, reliable pressure controlled self-fluching in-line emitter unit.

The flow restricting flowpath specifically illustrated above is of the kind having oppositely directed sets of baffle teeth preferably of the kind disclosed in our co-pending Patent Application No. 43483. It will be realised however that other forms of flowpaths may be employed.

Whilst as described above the membrane is formed of rubber other resiliently flexible, natural or synthetic elastomeric materials can be employed.

The cover member can be fitted to the well structure by being welded thereto or can be snap-fitted thereto. The well structure itself can be formed without any base wall at all.

Whilst the rectangular shaped well structure described above is to be preferred other shapes of structures such as for example circular or elliptical can be employed.

I claim:

1. An in-line emitter unit comprising a tubular connector member having end portions adapted to connect together two successive lengths of irrigation conduit, a substantially rectangular shaped well structure formed integrally with an outer wall portion of the connector member, an inlet formed in said outer wall portion serving to effect communication between the interior of the tubular connector and the well structure; a correspondingly substantially rectangular shaped cover member adapted to cover the well structure, an elongated groove formed in an inner wall of the cover member, a recessed cavity formed in said inner wall and communicating with one end of the groove and being of extended dimensions as compared with the width of the groove, an outlet bore constituting a unit outlet and formed coaxially in a base portion of the cavity and having a rim area substantially less than that of the cavity, a resiliently flexible membrane located in the well strucure and juxtaposed with respect to the inner wall so as to define with said groove a flow restricting flowpath, a second and opposite end of said groove communicating with the interior of the well structure; the arrangement being such that the membrane is displaceable towards and away from the base portion of the cavity in accordance with pressure variations so as to stabilize the output rate of the emitter unit with respect to the variations.

2. An emitter unit according to claim 1 wherein flowpath includes a plurality of flow resisting baffles.

3. An emitter unit according to claim 1 wherein said well structure is formed with a pair of oppositely located inlets formed in said outer wall portion and said cover member is formed, at the end thereof remote from said opposite end of the groove, with obturating means serving, when said cover member covers said well structure substantially to seal either of said inlets.

4. An emitter unit according to claim 1 wherein said well structure is formed with a peripheral wall and said cover member is formed with a peripheral flange adapted to be sealed to an upper surface of said peripheral wall.

5. An in-line emitter unit comprising a tubular connector member having end portions adapted to connect together two successive lengths of irrigation conduit, a well structure formed integrally with an outer wall portion of the connector member, an inlet formed in said outer wall portion serving to effect communication between the interior of the tubular connector and the well structure, a cover member adapted to cover the well structure, an elongated groove formed in an inner wall of the cover member, a recessed cavity formed in said inner wall and communicating with one end of the groove and being of extended dimensions as compared with the width of the groove, an outlet bore constituting a unit outlet and formed coaxially in a base portion of the cavity and having a rim area substantially less than that of the cavity, a resiliently flexible membrane located in the well structure and juxtaposed with respect to the inner wall so as to define with said groove a flow restricting flowpath, a second and opposite end of said groove communicating with the interior of the well structure; the arrangement being such that the membrane is displaceable towards and away from the base cavity portion of the cavity in accordance with pressure variations so as to stabilize the output rate of the emitter unit with respect to the variations.

6. An emitter unit according to claim 5 wherein flowpath includes a plurality of flow resisting baffles.

7. An emitter unit according to claim 5 wherein said well structure is formed with a peripheral wall and said cover member is formed with a peripheral flange adapted to be sealed to an upper surface of said peripheral wall.

8. An in-line emitter unit comprising a tubular connector member having an outer wall and end portions for connecting together two successive lengths of irrigation conduit; a substantially rectangular shaped well structure formed integrally with a portion of the circumference of said outer wall of said tubular connector member; inlet means formed in said outer wall portion for effecting communication between the interior of the tubular connector and the well structure; a cover member covering the well structure and having an inner wall; a plurality of baffles defining an elongated groove formed in the inner wall of the cover member with an end of said groove communicating with the interior of the well structure; a recessed cavity formed in said inner wall and communicating with another end of the groove and being of extended dimensions as compared with the width of the groove; an outlet bore constituting a unit outlet and formed coaxially in a base portion of the cavity and having a rim area substantially less than that of the cavity; and means to stabilize the output rate of the emitter unit with respect to pressure variations comprising a resiliently flexible membrane located in the well structure and juxtaposed with respect to the inner wall so as to define with said groove a flow restricting flowpath and the membrane being displaceable towards and away from the base portion of the cavity in accordance with the pressure variations.

* * * * *